(12) United States Patent
Urbach et al.

(10) Patent No.: US 10,810,797 B2
(45) Date of Patent: Oct. 20, 2020

(54) AUGMENTING AR/VR DISPLAYS WITH IMAGE PROJECTIONS

(71) Applicant: OTOY, INC., Los Angeles, CA (US)

(72) Inventors: Julian Michael Urbach, Los Angeles, CA (US); Nicolas Lazareff, Los Angeles, CA (US); Clay Sparks, Los Angeles, CA (US)

(73) Assignee: OTOY, INC, Los Angeles, CA (US)

( * ) Notice: Subject to any disclaimer, the term of this patent is extended or adjusted under 35 U.S.C. 154(b) by 43 days.

(21) Appl. No.: 14/719,756

(22) Filed: May 22, 2015

(65) Prior Publication Data

US 2016/0343164 A1 Nov. 24, 2016

(51) Int. Cl.

| | |
|---|---|
| *G06T 19/00* | (2011.01) |
| *G06T 13/80* | (2011.01) |
| *G02B 27/01* | (2006.01) |
| *G02B 27/00* | (2006.01) |

(52) U.S. Cl.
CPC ........ *G06T 19/006* (2013.01); *G02B 27/0093* (2013.01); *G02B 27/017* (2013.01); *G06T 13/80* (2013.01); *G02B 2027/014* (2013.01); *G02B 2027/0187* (2013.01); *G06T 2207/30204* (2013.01); *G06T 2210/61* (2013.01); *G06T 2215/16* (2013.01)

(58) Field of Classification Search
CPC ... G06T 19/006; G06T 13/80; G06T 2215/16; G06T 2207/30204; G06T 2200/04; G06T 2210/61; G06K 9/0061; G06K 9/00671; G06K 9/00302; G02B 27/017; G02B 27/0093; G02B 2027/0187; G02B 2027/014

USPC .......................................................... 345/633
See application file for complete search history.

(56) References Cited

U.S. PATENT DOCUMENTS

| 8,854,282 B1 | 10/2014 | Wong | |
|---|---|---|---|
| 2004/0227699 A1 | 11/2004 | Mitchell | |
| 2005/0035980 A1* | 2/2005 | Lonsing | G06T 15/00 345/633 |
| 2009/0285483 A1* | 11/2009 | Guven | G06Q 30/016 382/181 |

(Continued)

FOREIGN PATENT DOCUMENTS

| KR | 1020110104676 A | 9/2011 |
|---|---|---|
| KR | 1020110116422 A | 10/2011 |
| WO | 02052330 A2 | 7/2002 |

OTHER PUBLICATIONS

International Search Report and Written Opinion to corresponding International Application No. PCT/US2016/032975, dated Sep. 1, 2016.

*Primary Examiner* — Ke Xiao
*Assistant Examiner* — Kim Thanh T Tran
(74) *Attorney, Agent, or Firm* — James J. DeCarlo; Greenberg Traurig, LLP

(57) ABSTRACT

Systems and methods for generating and animating virtual representations to a wearer of a HMD device are disclosed. A virtual representation associated with a real-world object is retrieved based on received input data. The retrieved virtual representation is rendered for display to the wearer. Sensor data tracking one or more of the real-world object and the wearer is also received. The rendered virtual representation can be further animated based on the sensor data.

44 Claims, 11 Drawing Sheets

(56) References Cited

U.S. PATENT DOCUMENTS

| | | | |
|---|---|---|---|
| 2012/0194549 A1* | 8/2012 | Osterhout | G02B 27/0093 |
| | | | 345/633 |
| 2012/0194550 A1* | 8/2012 | Osterhout | G06F 3/011 |
| | | | 345/633 |
| 2013/0044128 A1* | 2/2013 | Liu | G09G 5/00 |
| | | | 345/633 |
| 2013/0095924 A1* | 4/2013 | Geisner | G06F 3/012 |
| | | | 463/32 |
| 2013/0136369 A1* | 5/2013 | Chang | G06T 7/223 |
| | | | 382/218 |
| 2013/0194164 A1 | 8/2013 | Sugden | |
| 2013/0201185 A1* | 8/2013 | Kochi | G06F 3/011 |
| | | | 345/419 |
| 2013/0307855 A1* | 11/2013 | Lamb | G02B 27/225 |
| | | | 345/473 |
| 2014/0022281 A1* | 1/2014 | Georgeson | G06F 3/1454 |
| | | | 345/633 |
| 2016/0377381 A1* | 12/2016 | Lyren | F41G 3/04 |
| | | | 345/633 |

* cited by examiner

AUGMENTING AR/VR DISPLAYS WITH IMAGE PROJECTIONS

BACKGROUND

Rapid developments that occurred in the Internet, mobile data networks and hardware led to the development of many types of devices. Such devices include larger devices like laptops to smaller devices that comprise wearable devices that are borne on users' body parts. Examples of such wearable devices comprise eye-glasses, head-mounted displays (HMDs), smartwatches or devices to monitor a wearer's biometric information. Mobile data comprising one or more of text, audio and video data can be streamed to such wearable devices. Some wearable devices such as the eye-glasses or HMDs produce virtual reality (VR) displays wherein the surroundings are not visible to a wearer of the HMD. Some wearable devices operate to produce augmented reality (AR) displays wherein images/text or other renderings are overlaid on an existing display of the surroundings that the wearer can see the surroundings in addition to the overlay.

SUMMARY

This disclosure relates to systems and methods for generating virtual representations for display on HMD devices based on identifying indicia associated with real-world objects. A method for providing virtual representations is disclosed in one embodiment. The method comprises receiving, by a processor in communication with a HMD (Head Mounted Display) device of a wearer, input data associated with a real-world object wherein the input data comprises indicia identifying a virtual representation and which indicia are detectable by the HMD device. The method further comprises detecting the indicia from the input data, retrieving the virtual representation based on the identifying indicia and providing a display of the retrieved virtual representation in association with the real-world object on a display screen of the HMD for display to the wearer. In some embodiments, the method further comprises receiving, by the processor, sensor data comprising information representing sensed state of the real-world object, enabling animation of the displayed virtual representation based on the sensor data and providing the animated virtual representation to the display screen for display to the wearer. In some embodiments, the method further comprises displaying, by the processor, the animated virtual representation in synchrony with the sensor data.

In some embodiments, the real-world object is co-located with the wearer and the sensor data further comprises tracking data of the real-world object. The method of animating the virtual representation based on the tracking data further comprises animating, by the processor, the virtual representation based on audio data and video data associated with the real-world object, the real-world object being a participant in a teleconference with the wearer. The method of retrieving the virtual representation based on the identifying indicia further comprises retrieving, by the processor, a photo-realistic virtual representation of the participant based on the identifying indicia.

In some embodiments, animating the virtual representation further comprises accessing, by the processor, a plurality of programming structures respectively corresponding to a plurality of predetermined expressions that are configured for application to the virtual representation, selecting, by the processor, one of the predetermined expressions based at least on the sensor data and animating, by the processor, the virtual representation in accordance with the selected predetermined expression.

In some embodiments, animating the virtual representation further comprises, identifying, by the processor based at least on the sensor data, a portion of the virtual representation for the animation. In some embodiments, the method further comprises receiving, by the processor, head tracking data associated with movement of the wearer's head and adjusting, by the processor, a render of the animated virtual representation based on the head tracking data.

In some embodiments, the method comprises receiving, by the processor, eye tracking data associated with movement of the wearer's eyes and adjusting, by the processor, a render of the animated virtual representation based on the eye tracking data. In some embodiments, the method comprises enabling, by the processor, foveated rendering of the animated virtual representation based on the eye tracking data.

A HMD (Head Mounted Display) device comprising a processor, a display screen and non-transitory storage medium comprising programming logic for execution by the processor is disclosed in some embodiments. In some embodiments, the programming logic comprises, data receiving logic that receives input data associated with a real-world object and sensor data associated with at least one of the real-world object and a wearer of the HMD device wherein the input data comprising detectable indicia identifying a virtual representation. The programming logic further comprises retrieving logic that retrieves the virtual representation based on the identifying indicia, display providing logic that provides a display of the retrieved virtual representation in association with the real-world object on a display screen of the HMD for display to the wearer, sensing logic that receives sensor data comprising sensed state of at least the real-world object. The sensed state data can comprise data associated with position, motion, speech, sound, expression and the like of one or more of the real-world object and the wearer. The programming logic further comprises animating logic that animates the virtual representation in the display to comport with the sensor data and displaying logic that displays the animated virtual representation on the display screen of the HMD to the wearer.

In some embodiments, the real-world object is co-located with the wearer and the sensor data further comprises tracking data of the real-world object. In some embodiments, the animating logic further comprises logic for animating the virtual representation based on audio data and video data associated with the real-world object, the real-world object being a participant in a teleconference with the wearer. In some embodiments, the retrieving logic further comprises logic for retrieving a photo-realistic 3D representation of the participant based on the identifying indicia.

In some embodiments, animating logic further comprises accessing logic that accesses a plurality of programming structures respectively corresponding to a plurality of predetermined expressions that are configured for application to the virtual representation, selecting logic that selects one or more of the predetermined expressions based at least on the sensor data and logic for manipulating the virtual representation in accordance with the selected predetermined expressions.

In some embodiments, the animating logic further comprises portion identifying logic for identifying based at least on the sensor data, a portion of the virtual representation for the manipulation. In some embodiments, the device further comprises positioning logic for positioning a render of the virtual representation at a location of a marker on the real-world object, the marker being the identifying indicia. The programming logic further comprises head tracking data receiving logic that receives head tracking data associated with movement of the wearer's head and adjusting logic that adjusts a render of the animated virtual representation based on the head tracking data.

In some embodiments, the device further comprises a sensor configured to track eye movement of the wearer's eyes. In some embodiments, the device further comprises eye tracking data receiving logic that receives eye tracking data associated with movement of the wearer's eyes from the sensor, logic for further adjusting the render of the animated virtual representation based on the eye tracking data and foveated rendering logic for rendering within a field of view of the wearer, the animated virtual representation based on the eye tracking data.

Non-transitory computer readable storage medium comprising processor executable instructions for facilitating display of animated virtual 3D representations are disclosed in some embodiment. The non-transitory medium comprises processor-executable instructions for receiving in communication with a HMD (Head Mounted Display) device of a wearer, input data associated with a real-world object. The input data comprises detectable indicia identifying a virtual representation. The medium further comprise instructions for retrieving the virtual representation based on the identifying indicia and providing a display of the retrieved virtual representation in association with the real-world object on the display screen of the HMD for display to the wearer. In addition, the non-transitory medium comprises instructions for receiving sensor data comprising information representing sensed state of at least the real-world object, enabling animation of the displayed virtual representation based on the sensor data and providing the animated virtual representation to the display screen for display to the wearer.

In some embodiments, the real-world object is co-located with the wearer and the sensor data further comprises tracking data of the real-world object and the instructions for animating the virtual representation based on the tracking data further comprise instructions for animating the virtual representation based on one or more of audio data and video data associated with the real-world object In some embodiments, the real-world object can be a participant in a teleconference with the wearer. In some embodiments, the instructions for retrieving the virtual representation based on the identifying indicia further comprise instructions for, retrieving a photo-realistic 3D representation of the participant based on the identifying indicia. In some embodiments, the medium further comprises the instructions for accessing a plurality of programming structures respectively corresponding to a plurality of predetermined expressions that are configured for application to the virtual representation, selecting one of the predetermined expressions based at least on the sensor data and animating the virtual representation in accordance with the selected predetermined expression. In some embodiments, the instructions for animating the virtual representation further comprises instructions for identifying, based at least on the sensor data, a portion of the virtual representation for the animation.

In some embodiments, the medium comprises instructions for displaying the animated virtual representation in synchrony with the sensor data. The instructions for displaying the animated virtual representation in synchrony with the sensor data further comprise instructions for positioning a render of the virtual representation at a location of a marker on the real-world object wherein the marker is the identifying indicia. In some embodiments, the medium further comprises instructions for receiving head tracking data associated with movement of the wearer's head, adjusting a render of the animated virtual representation based on the head tracking data In some embodiments, the medium comprises instructions for enabling foveated rendering. In such embodiments, the medium comprises instructions for receiving eye tracking data associated with movement of the wearer's eyes, adjusting a render of the animated virtual representation based on the eye tracking data and rendering within a field of view of the wearer, the animated virtual representation based on the eye tracking data.

A method of updating a virtual representation on a display screen of a HMD (Head Mounted Display) is disclosed in some embodiments. The method comprises receiving from a remote rendering server, by a processor comprised a HMD (Head Mounted Display) device of a wearer, a virtual representation associated with a real-world object, displaying, by the processor, the virtual representation on a display screen of the HMD device, updating, by the processor, the virtual representation based on sensor data associated with the real-world object and providing, by the processor, the updated virtual representation on the display screen of the HMD device for display to the wearer.

In some embodiments, the method further comprises receiving, by the processor, the sensor data wherein the real-world object is co-located with the wearer and wherein the sensor data further comprises tracking data of the real-world object. The method further comprises transmitting, by the processor to the remote rendering server, the sensor data.

In some embodiments, the method of receiving the virtual representation, by the processor further comprises receiving identifying indicia associated with the real-world object, transmitting, the identifying indicia to the remote rendering server and receiving, by the processor, a photo-realistic virtual representation of a teleconference participant based on the identifying indicia. In some embodiments the method further comprises positioning, by the processor, a render of the virtual representation at a location of a marker on the real-world object, the marker being the identifying indicia and displaying the updated virtual representation in synchrony with the sensor data.

In some embodiments a non-transitory computer readable storage medium comprising processor executable instructions for carrying out the aforementioned method of updating a virtual representation is disclosed.

A HMD (Head Mounted Display) device for rendering virtual representations of users is disclosed in some embodiments. The HMD comprises a processor, a display screen and non-transitory storage medium comprising programming logic for execution by the processor. In some embodiments, the programming logic comprises representation receiving logic that receives from a remote rendering server, a virtual representation associated with a real-world object, display logic that displays the virtual representation on the display screen to a wearer wearing the HMD device, updating logic that updates the virtual representation based on sensor data associated with the real-world object and update providing logic that provides the updated virtual representation on the display screen of the HMD device for display to the wearer.

In some embodiments, the programming logic further comprises sensor data receiving logic that receives the sensor data wherein the real-world object is co-located with the wearer and the sensor data further comprises tracking data of the real-world object and transmitting logic that transmits the sensor data to the remote rendering server. In some embodiments, receiving the virtual representation further comprises indicia receiving logic that receives identifying indicia associated with the real-world object, transmitting logic that transmits the identifying indicia to the remote rendering server and logic that receives a photorealistic virtual representation of a teleconference participant based on the identifying indicia. In some embodiments the programming logic further comprises positioning logic that positions a render of the virtual representation at a location of a marker on the real-world object, the marker being the identifying indicia.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
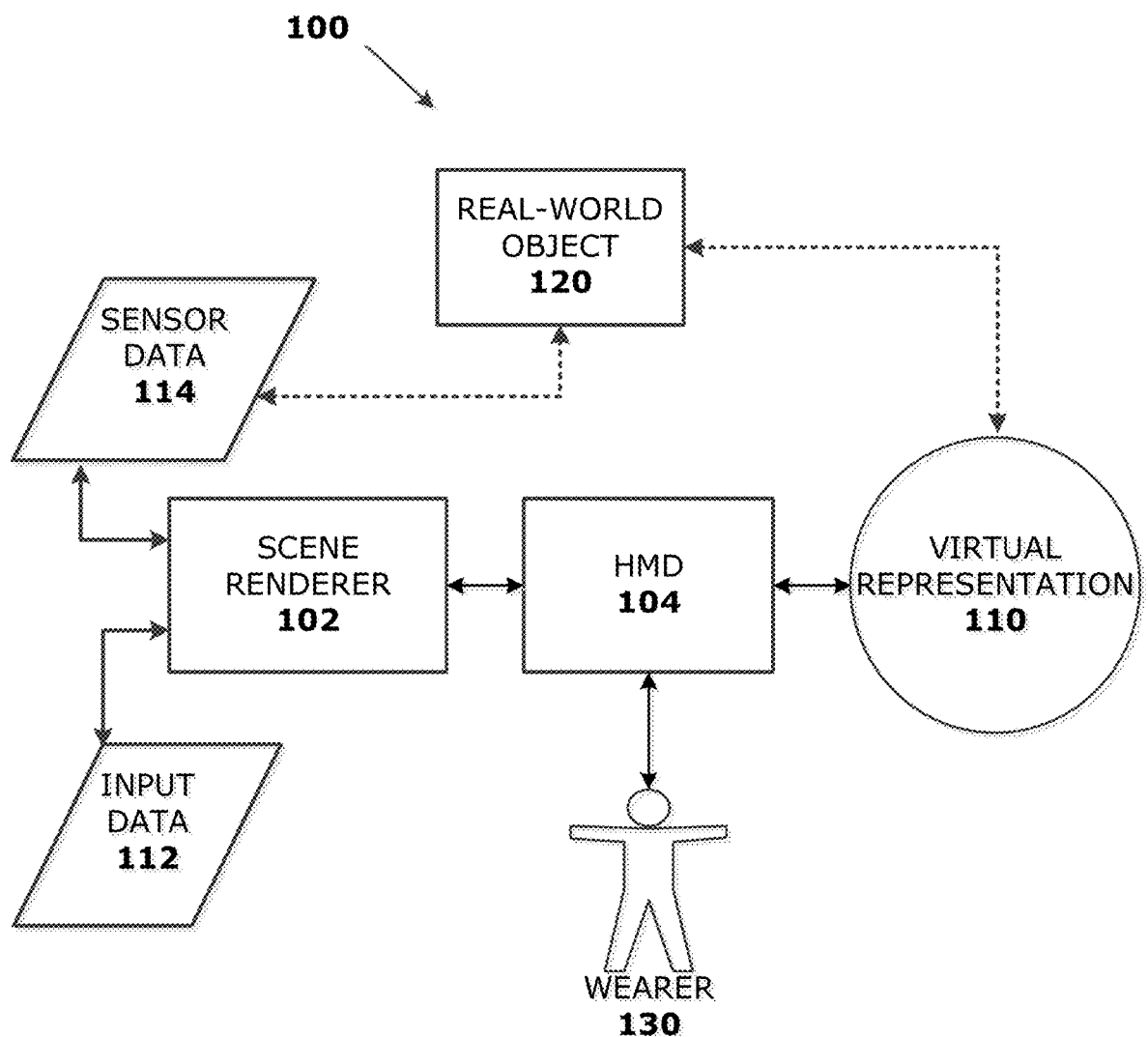
FIG. 1 is a schematic diagram of an apparatus for generating a 3D representation in accordance with some embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The proliferation of mobile data networks and smart devices resulted in instantaneous availability of information so that a person who desires information can instantaneously obtain it via accessing a related website using a smart device such as but not limited to a tablet, smartphone, a phablet and the like. However, the advent of wearable devices presents new challenges to information access. For example, typing text such as URLs on tiny surfaces such as the face of a wearable device such as a smartwatch can be very difficult. Therefore, many information sources have replaced text with codes that can be scanned thereby saving the users the tedium of having to type lengthy URLs. When the code, such as a QR code is scanned by a device, the device can execute an action, such as opening a browser and navigating to the website, based on the scanned code.

AR (Augmented Reality) glasses such as GOOGLE GLASS and VR (Virtual Reality) headsets such as Occulus Rift have gained popularity among the devices worn on users' faces. Embodiments are disclosed wherein image projections such as a virtual 3D representation is generated based on identifying indicia such as scanned codes. The 3D representations can be further animated based on data from a real-world object that the 3D representations may be associated with. FIG. 1 is a schematic diagram of an apparatus for generating a virtual representation 110 in accordance with some embodiments. In some embodiments, the virtual representation can be a 2D or 3D representation. The apparatus comprises a Head Mounted Display (HMD) device 104 configured to display one of an AR or VR display on a display screen associated therewith. A scene renderer 102 comprised within the HMD device 104 or otherwise communicatively coupled to the HMD device 104 receives input data 112 such as but not limited to identifying indicia that enable generation of the appropriate virtual representation. In some embodiments, the virtual representation can comprise a virtual, photorealistic, 3D (3 dimensional) representation of the real-world object 120 which could be a person, a robot, an inanimate or animate entity. In some embodiments, the identifying indicia can be a QR code which enables rendering and displaying a particular virtual representation, or other detectable indicia in, on, proximate to, or forming all or a part of the real-world object 110 being sensed for the generation of the virtual representation 110. For example, physical features such as facial features of a person who is the real-world object 120 can be sensed and the virtual representation 110 can be identified and retrieved based on face-recognition techniques.

Furthermore, the scene renderer 102 can be further configured to receive sensor data 114 related to a real-world object 120 that is associated with the virtual representation 110. In some embodiments, the sensor data 114 can comprise information regarding the state and changes thereof of one or more of the real-world object 120 and the wearer 130. Such state information can comprise without limitation information associated with position such as a state of rest or motion, video data which can comprise facial expression or audio data which can include sound, voice. For example, the real-world object 120 can be a person bearing the input data 112 thereon and the sensor data 114 can comprise an outward-facing camera data of the HMD device 104 as a wearer 130 who wears the HMD device 104 looks at the person. By the way of illustration and not limitation, if the person is wearing a t-shirt with the input data 112 such as the QR code printed thereon, the wearer 130 who wears the HMD 102 will see the virtual representation 110 in place of the QR code on the t-shirt. In some embodiments, the virtual representation 110 can be generated and displayed at the location of the QR code.

For the example discussed above, a virtual representation 110 comprising an image object of a popular cartoon character may be seen by the wearer 130 at the location of the QR code as being overlaid on the t-shirt in an AR view. In other embodiments the representation 110 may completely replace the real-world object 120 or the person as seen by the wearer 130 in the HMD 104 in an AR display, so the real-world object 120 being viewed or sensed is completely occluded or partially replaced by the virtual representation 110 such as a cartoon rendering, or the appearance of another person or character, or a robot, or other entity.

In some embodiments, the virtual representation 110 can be seen and the real-world object may not be visible. For example, in a VR display only the virtual representation 110 will be seen while the person need not be visible to the wearer 130. It may be appreciated that although the real-world object in this example is a person, it is only by the way of illustration and that other animate/inanimate, living/non-living things can be a real-world object 112 in accordance with other embodiments.

Furthermore, the virtual representation 110 can be manipulated or animated based on the sensor data 114 associated with the real-world object 120. In some embodiments, the sensor data 114 can include data regarding interaction of the real-world object 110 with the wearer 130. Returning to the example of the person wearing a t-shirt with the QR code, as the person moves, the sensor data 114 can include the camera data tracking the motion of the person. Accordingly, the virtual representation 110 can also be moved across a display of the HMD 102 to track the motion of the person.

In some embodiments, the sensor data 114 can be used to retrieve certain animations that can be applied to the virtual representation in an AR display or a VR display. For example, if the sensor data 114 indicates a linear motion, animations such as walking or running can be applied to the virtual representation 110 shown to the wearer 130 on a display screen of the HMD 102. In another example, if the sensor data 114 indicates a circular motion, animations such as dancing can be applied to the virtual representations. It may be appreciated that virtual representation 110 thus generated can comprise but are not limited to cartoon characters, photo-realistic representations of real/fictitious characters, representations of non-living things and the like.

In some embodiments, the virtual representation 110 can be anchored to the real-world object 120 so that any movement by the real-world object can be replicated or mimicked by the virtual representation 110. In another example, the real-world object 112 can be a person wearing a cap with a QR code, or the person can be wearing glasses, or bearing a sticker or temporary or permanent tattoo or other detectable marking. The HMD device 104 retrieves, renders and displays a particular virtual representation 110 based on the QR code. The virtual representation 110 thus generated can be anchored to the person's face so that the facial movements of the person are mimicked by the virtual representation 110. Various facial movements such as frowning, laughing, opening mouth, raising eyebrows and the like can be simultaneously reflected by the virtual representation 110. In some embodiments, the real-world object 120 can be located in proximity to the HMD device 104 so that the wearer 130 is able to perceive the real-world object 120 with the naked eye and is within sensor range of HMD 104. In some embodiments, the real-world object 120 can be located remotely from the wearer 130. In this case, one or more of the input data 112 and the sensor data 114 can be received by the HMD device 104 via its communication hardware. For example, one or more of the audio-video data of a remotely located real-world object can be transmitted to the HMD device 104 which is configured to show such data to the wearer 130 on its display screen.

In some embodiments, the scene renderer 102 that receives the input data 112 and the sensor data 114 can be one or more of a hardware or software component comprised within the HMD device 104. In some embodiments, the scene renderer 102 that receives the input data 112 and the sensor data 114 can be one or more of a hardware or software component comprised on a server (not shown) remote from the HMD device 104. In the latter case, the HMD device 104 transmits the input data 112 and the sensor data 114 to the remote server and receives from the server the rendered virtual representation 110 which is shown to the wearer 130 on a display screen of the HMD device 104. In some embodiments, wherein the scene renderer 102 is executed on a remote server, the input data 112 comprising the identifying indicia and/or the sensor data can be received directly from the real-world object or sensors associated therewith without participation of by the HMD device 104, or with just partial participation. In some embodiments, the manipulation of the virtual representation 110 based on the sensor data 114 can be executed by the HMD device 104. In some embodiments, the manipulation of the virtual representation 110 based on the sensor data 114 can be executed by the remote server and transmitted to the HMD device 104 for display to the wearer 130.

As discussed supra, the input data 112 can comprise identifying indicia that can be obtained via any method. For example, identifying indicia such as QR codes that can be received as optical data from an outward facing camera on the HMD device 104 are discussed herein as one example. However, other identifying indicia can also be received via other modalities. In some embodiments, the identifying indicia received as input data 112 can comprise audio/voice data of a particular user who is the real-world object 120 and accordingly, a virtual representation 110 comprising a 3D photo-realistic image of the particular user can be rendered and shown to the wearer by the HMD device, with facial movements generated as part of the virtual representation 110 that match or nearly match the spoken words or sounds, for example pursed lips for "oooh" sounds, wide open lips for "aaahh" sounds, and the like.

Similarly, the user who is the real-world object 120 can enter a user ID/password or a telephone number and the like via a text entry method or via other input mechanism. The user ID, telephone number etc., thus entered can be employed to retrieve a corresponding virtual representation 110.

The sensor data 114 can comprise in some embodiments, data that is received from an outward facing camera located on the HMD device 104. In addition, the sensor data 114 can also include data from other components of the HMD device 104 such as but not limited to, data obtained from audio components such as a microphone, data obtained from a magnetometer, a gyroscope, an accelerometer and the like. Depending on how the virtual representation 110 is configured for manipulation/animation, one or more of the aforementioned sensor data 114 can be employed. Accordingly, the virtual representation 110 can also be manipulated based on input provided by the wearer 130 through the HMD device 104. It can be appreciated that generation of only one virtual representation 110 is described herein solely for brevity and that any number of virtual representations can be generated, animated and displayed to the wearer 130 in accordance with embodiments described herein.

In some embodiments, each virtual representation is respectively associated with particular identifying indicia. In some embodiments, multiple virtual representations can be associated with a given identification indicia. In some embodiments, a virtual representation of the wearer 130 can also be generated and displayed to one or more remote teleconference participants. Thus, a virtual conference room environment is enabled by a teleconference system in accordance with embodiments herein so that a conference room environment is generated to include a uniform display of the respective photorealistic virtual representations of teleconference participants. The uniform display can create, for all the participants with their HMD devices whether in physical proximity to each other (wherein they can view each other with naked eyes) or remotely located from each other, an atmosphere of being in the same room from each participant's perspective.

Figure 2:
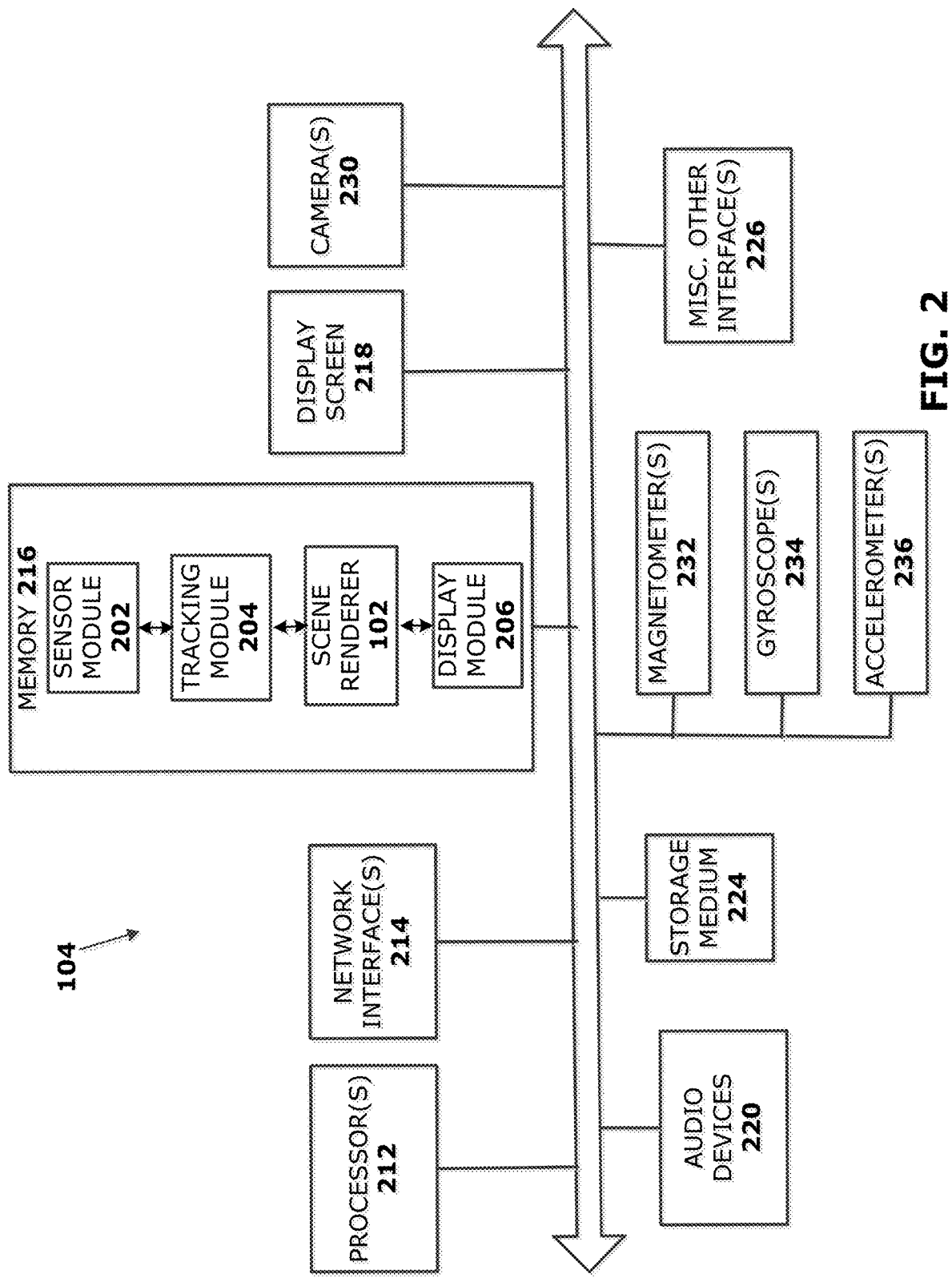
FIG. 2 is a schematic diagram of a HMD device with its various components that are communicatively coupled to each other in accordance with some embodiments.

FIG. 2 is a schematic diagram of a HMD device 104 with its various components that are communicatively coupled to each other in accordance with some embodiments. The HMD device 104 comprises one or more processors 212 for controlling various other modules and interfaces of the HMD device 104 thereby facilitating smooth execution of various tasks associated with tracking, rendering and displaying functions. A network interface 214 enables connecting the HMD device 104 to short range networks such as Bluetooth network and/or longer range networks such as, Wi-Fi and/or mobile data networks. A display screen 218 generally comprises of two screens. For a VR headset such as OCCULUS RIFT or SAMSUNG GEAR VR, the display screen can provide a resolution of about 960×1080 per eye with a 100 degree field of view. If the HMD device 104 is an AR device, the display screen 218 provides a high resolution display which in some devices like the GOOGLE GLASS can be equivalent of a 25 inch high definition screen from eight feet away. In addition, the HMD device 104 comprises other miscellaneous interfaces 226 such as but not limited to, USB, cable, HDMI and interfaces for providing AC/DC power.

Audio devices 220 can comprise microphone to receive audio data from the wearer's 130 end and speakers which can comprise a bone conduction transducer or even a separate headset attached to the HMD device 104 to provide audio output to the wearer 130 of the HMD device 104. Position/location sensors such as gyroscopes 234, magnetometers 232 and accelerometers 236 and one or more cameras 230 are also comprised in the HMD device 104 in accordance with some embodiments. These sensing components enable tracking the position and movement of the wearer 130. The cameras 230 can comprise an outward looking camera directed away from the wearer's face and providing a similar view to that of the wearer's 130 naked eyes in some embodiments. In some embodiments, the cameras 230 can comprise a camera turned inwards towards the wearer's 130 eyes. The outward looking camera enables gaze tracking of the wearer 130 or tracking the position of the real-world object 120. The inward looking camera can be configured for tracking the wearer's 130 eyes to enable functionality such as foveated rendering as will be detailed further herein.

In addition to the above, the HMD device 104 can comprise a memory 216 and a storage medium 224. In some embodiments, the memory 216 can comprise the various modules communicatively coupled to each other and employed to generate virtual representations in accordance with embodiments described herein. The various modules can comprise but are not limited to a sensor module 202, a scene renderer 102, a tracking module 204 and a display module 206. The sensor module 202 receives input data 112 and raw sensor data 114 from components such as the camera 230 or other sensor types such as IR (infrared), radio, thermal or other electronic or optical sensing device that can detect indicia and/or object characteristics as described herein and from one or more of the gyroscopes 234, magnetometers 232 and accelerometers 236. In some embodiments, the input data 112 can comprise identifying indicia that enable the scene renderer 102 to identify a virtual representation 110 that can be rendered. In some embodiments, the input data 112 comprising the identifying indicia can be received over a network via one of the network interfaces 214. In some embodiments, commonly-occurring virtual representations or virtual representations that are frequently viewed by the wearer 130 can be locally stored within the HMD device 104 either in the memory 216 or in a storage medium 224.

The information regarding the identifying indicia for a particular virtual representation received by the sensor module 202 is communicated to the scene renderer 102. The scene renderer 102 can be configured to retrieve information regarding a particular virtual representation corresponding to the received input data 112 either from the local memory 216 storage medium 224 or from a remote source via one of the network interfaces 214. Various modules within the scene renderer 102 provide the geometry which the scene renderer 102 combines with the animation, textures and the like to output a rendered scene comprising the virtual representation 110. In the case of a light-field, the scene renderer 102 uses the aforementioned data to appropriately update the light-field's display.

The display module 206 receives an API (Application Programming Interface) and displays a platform-agnostic scene and then maps it to the appropriate graphics API or display method. The final scene comprising the virtual representation 110 is forwarded to the display screen 218 for presentation to the wearer 130. Although generation of only one virtual representation based on a single identifying indicia is discussed supra, it can be appreciated that multiple virtual representations can be generated based on multiple ones of the identifying indicia received within the input data 112. For example, different combinations of identifying indicia mentioned above can be received simultaneously for the corresponding simultaneous generated multiple virtual representations.

In addition, it can be appreciated that a scene can be a VR scene wherein the wearer 130 cannot see his/her real-world surroundings. Within the VR scene only the rendered virtual representations are shown to the wearer 130 on the display screen 218 in some embodiments. In some embodiments, the rendered virtual representations along with rendered background scenery are shown to the wearer 130 on the display screen 218. In some embodiments, the final scene can be an AR scene wherein the wearer 130 is able to view his/her real-world surroundings and the virtual representation 110 is rendered as an overlay at a predetermined position on the display screen 218 relative to real-world surroundings. In some embodiments, the rendered virtual representation 110 can be anchored to the real-world object 120 so that interactions of the real-world object 120 can result in animation of the rendered virtual representation 110.

In some embodiments, the sensor module 202 is further configured to track the real-world object 120 based on data from the sensing components of the HMD device 104. The sensor data 114 thus received is transmitted to the tracking module 204 which fuses the raw sensor data 114 to create the final pose (position and orientation) and animation in space for the virtual representation 110 based on the real-world object 120 that is being tracked by the sensing components. Such sensor data 114 can include but is not limited to, optical or electronic or electromagnetic data received from the camera 230 or other sensor(s) and/or data received from the position sensing components of the HMD device 104 that comprise one or more of the gyroscopes 234, magnetometers 232 and accelerometers 236. The data received from one or more of the gyroscopes 234, magnetometers 232 and accelerometers 236 enables vision tracking or tracking the direction of the wearer's 130 gaze. Based on the data from the position sensing components of the HMD device 104, one or more of the position, orientation and animation of the virtual representation 110 can be determined. Again, it can be appreciated that the sensor data 114 can be continuously received either from the components on board the HMD device 104 or via a network from a disparate device remote from the HMD device 104. As the real-world object 120 is continuously tracked, the sensor data 114 is received continuously or near-continuously and the virtual representation 110 that is continuously animated is shown to the wearer 130 on the display screen 218 by the display module 206.

Figure 3:
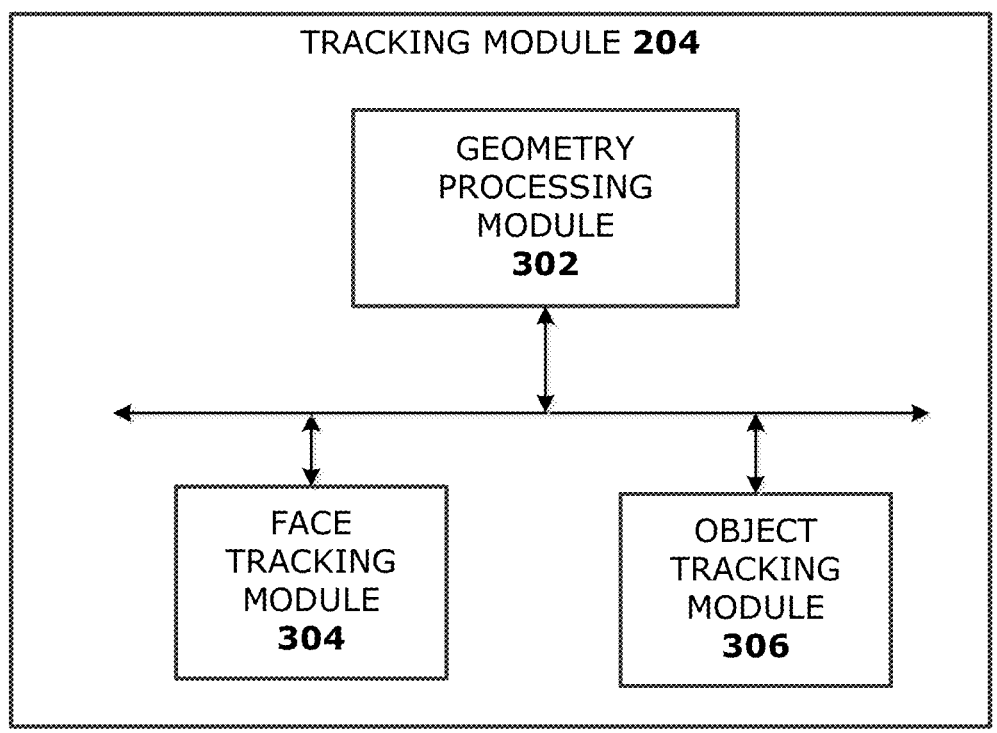
FIG. 3 is a schematic diagram of the tracking module in accordance with one embodiment.

FIG. 3 is a schematic diagram of the tracking module 204 in accordance with one embodiment. The tracking module 204 receives the input data 112 and packaged sensor data from the sensor module 202, fuses data to create the final pose (position and orientation) and animation in space for the virtual representation 110. The output of the tracking module 204 is a scene graph which can be employed by the scene renderer 102 for final processing and then displayed to the wearer 130. By the way of illustration and not limitation, scene graphs are data structures used to hierarchically organize and manage the contents of spatially oriented scene data thereby enabling scene composition and management. In some embodiments, the tracking module 204 comprises a geometry processing module 302, a face tracking module 304 and an object tracking module 306. The geometry processing module 302 receives the packaged sensor data and assembles a scene comprising the virtual representation 110.

In some embodiments, the virtual representation 110 can comprise a photo-realistic 3D recreation of a person's face which can be anchored to the real-world object 120 which comprises the actual face of the person in applications such as video conferencing. In such embodiments, the face tracking module 304 analyzes images from the camera data to generate a scene graph representation of the actual facial data that captures gestures, expressions and movement. By the way of illustration and not limitation, various facial gestures such as frowning, laughing, rounding/stretching of lips, lifting of the eyebrows, closing the eyes, movement of the jaws, turning of the head and the like can be tracked from the camera data and appropriate scene graphs can be generated. This is used by the scene renderer 102 in rendering the photo-realistic representation that tracks the person's facial gestures in real-time.

In some embodiments, the virtual representation 110 can comprise an image object of a cartoon character and the like. As discussed supra, the image object can be retrieved in response to the recognition of particular identifying indicia such as a marker positioned on the surface of the real-world object 120. In some embodiments, as the real-world object 120 moves, the movement data of the real-world object 120 can be gathered from one or more of the camera data or data from the sensors alone or as well as from the gyroscope 234, magnetometer 232 and accelerometer 236. Based on such tracking, the object tracking module 306 generates an appropriate representation in the scene graph comprising the virtual representation 110.

Figure 4:
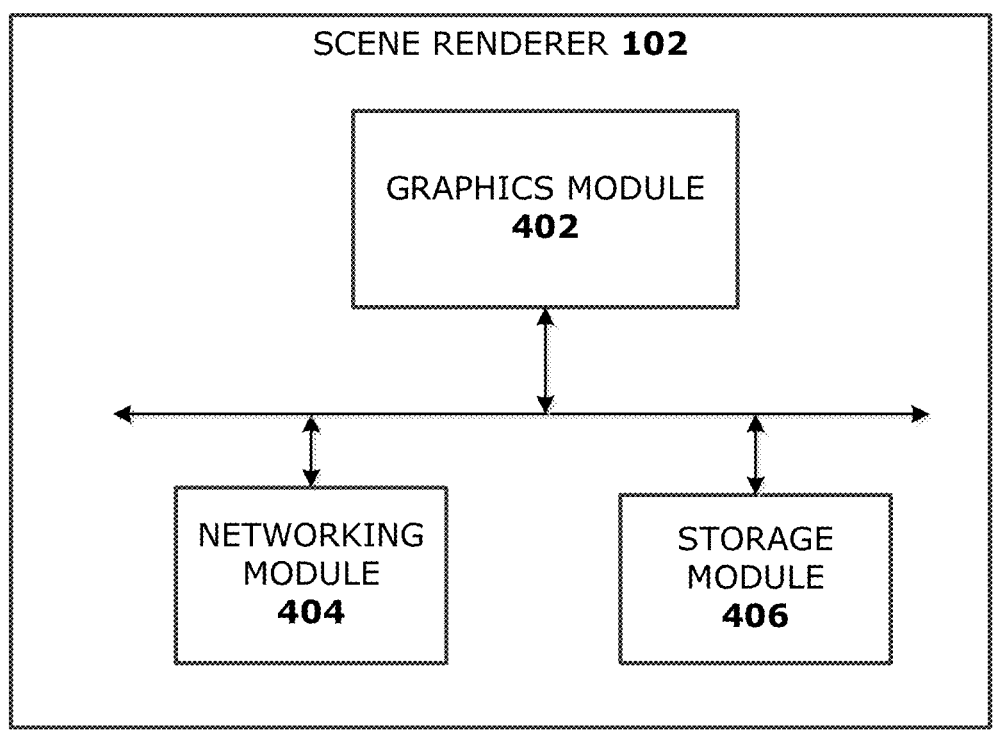
FIG. 4 is a schematic diagram of the scene renderer in accordance with embodiments described herein.

FIG. 4 is a schematic diagram of the scene renderer 102 in accordance with embodiments described herein. The scene renderer 102 receives the scene graph generated by the tracking module 204 and renders a scene. The scene graph provides the geometry and the scene renderer 102 combines that with its knowledge of the geometry (mesh), animation and textures of the tracked objects that comprise one or more virtual representations. When rendering light-fields, the scene renderer 102 uses the data appropriately to update the light-field's display.

In some embodiments, an entire scene comprising the virtual representation 110 and its environment is rendered and displayed to the wearer 130, for example, in a VR mode wherein the real-world surroundings are not visible to the wearer 130. In some embodiments, the scene renderer 102 renders just the virtual representation 110 overlaid on a particular portion of a view of the real-world surroundings of the wearer 130 such as in a AR mode. In some embodiments, the virtual representation 110 can be generated based on the view tracking wherein a position of the wearer's gaze can be determined based on the sensor data 114 and the virtual representation 110 can be generated at the focal point of the wearer's gaze.

In some embodiments, the wearer's 130 eyes can be tracked via the sensor data 114 generated for example, by an inward-facing camera on the HMD device 104. Such eye tracking enables the scene renderer 102 to execute foveated rendering in the VR or AR mode wherein the objects/entities in the field of view of the wearer 130 are rendered with high resolution in sharp focus. The remaining portions of the scene can be rendered slightly out-of-focus or with less resolution that the portion in the field of view of the wearer 130. Again, the various portions of the scene can be brought into focus or made out-of-focus based on the movements of the wearer's 130 gaze. This enables optimizing processing power as rendering of 3D objects is a processor-intensive task. In addition, if the scene renderer 102 rendering the virtual representation 110 is being executed by a disparate server remotely located from the HMD device 104, the network resources can be optimized via such foveated rendering as transmission of high-resolution images demands greater network resources as compared to images with lesser resolution.

In some embodiments, the scene renderer 102 comprises a graphics module 402, a networking module 404 and a storage module 406. The graphics module 402 handles generation of the virtual representation 110 in the virtual space. Various sub-modules of the graphics module 402 enable providing deformations for the virtual representation 110 and correctly displaying the light-fields and textures associated with the virtual representation. The networking module 406 provides other sub-modules of the scene renderer 102, data regarding local, peer-to-peer or cloud based network entities in the form of geometry, textures or light-fields. The storage module 406 is configured to store without limitation, meshes, light fields, textures and animations locally. In some embodiments, the storage module 406 can also be configured to store date related to certain frequently used identifying indicia and their corresponding virtual representations information. If the scene renderer 102 is comprised in the HMD device 104 then the contents of the storage module 406 can be stored in the memory 216 or other storage medium. If the scene renderer 102 is comprised on a disparate server then the contents of the storage module 406 are stored within the local storage of the disparate server.

Figure 5:
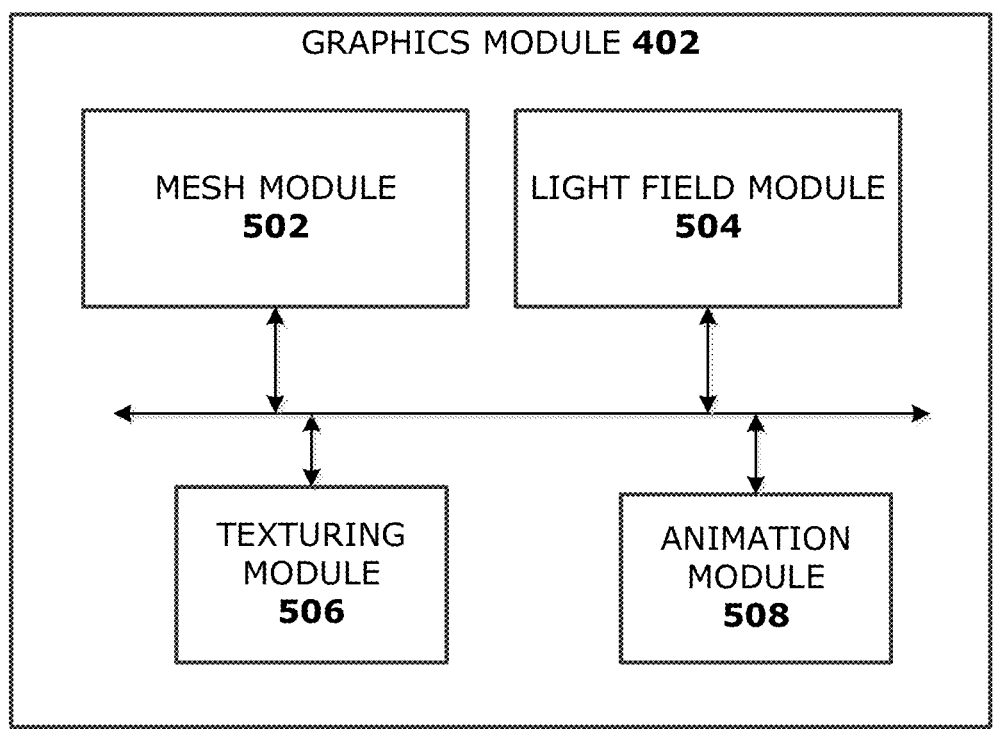
FIG. 5 is a schematic diagram of the graphics module in accordance with some embodiments.

FIG. 5 is a schematic diagram of the graphics module 402 in accordance with some embodiments. The graphics module 402 comprises a mesh module 502, a light field module 504, a texturing module 506 and an animation module 508. The mesh module 502 enables generating the virtual representation 110, for example, as a static 3D mesh configured for animation via joints and control handles, for example. In addition, the mesh module 502 also holds data like normal, UV coordinates, per vertex or per point data depending on the virtual representation 110 to be generated. The light-field module 504 employs the locally stored light field data or data from the network via the networking module 404 in combination with pose (position, orientation) from the tracking module 204 to enable displaying a light-field correctly placed and in perspective with relation to the wearer's 130 eyes. Using procedurally generated textures in combination with the real-time lighting information, for example, from the sensor data 114, the texturing module 506 generates the textures on the output mesh or the light-field.

The animation module 508 is configured to create geometry for the virtual representation 110. In some embodiments, the animation module 508 can use the locally stored animation data or data from the network in combination with known deformations to create such geometry. In some embodiments, information regarding new deformations can be received over the network. As described supra, the deformation of the virtual representation 110 can be based on various types of data comprised in the sensor data 114. The deformations/animations afforded by the camera data were discussed supra wherein the virtual representation 110 is animated to reflect the facial expressions or movement of the real-world object 120.

In some embodiments, the deformations or animations can also be based on audio input. For example, in a teleconference application, a virtual representation of a remote participant generated on the display screen 218 for the wearer 130 can be animated based on one or more of the audio input and video input received in the sensor data 114. In some embodiments, a photo-realistic virtual representation 110 of a remote teleconference participant can be generated locally on the HMD device 104. The deformation or animation of such photo-realistic virtual representation 110 can be based only on the audio data comprised in the sensor data 114.

Video data generally consumes greater bandwidth resources for transmission. Hence, the deformation or animation of the photo-realistic virtual representation of the remote participant based only on the audio data as described herein can provide the benefits of a live video conference while consuming less network resources compared to those a traditional video conference would require. Moreover, as the photo-realistic virtual representation 110 is generated locally and the lag in audio data transmission is less as compared to the video data, a teleconference as described herein would appear more realistic to the wearer 130.

In some embodiments, the deformation or animation of the photo-realistic virtual representation based on audio data can be language independent. Specific programming routines to be executed on the photo-realistic virtual representation 110 for the utterance of the various syllables can be defined within the animation module 508. As the audio data is analyzed and the syllables uttered are identified, the appropriate programming routine can be retrieved and applied to the photo-realistic virtual representation 110 in accordance with embodiments described herein. In some embodiments, the programming routines can identify the particular portion of the photo-realistic virtual representation 110 to be animated and how the identified portion should be animated. In some embodiments, the emotion expressed in the audio input can also be identified and the photo-realistic 3D virtual representation can be animated accordingly. For example, techniques associated with linguistic analysis or audio data analysis can be used to determine the expressions to be applied to the photo-realistic 3D virtual representation.

Figure 6A:
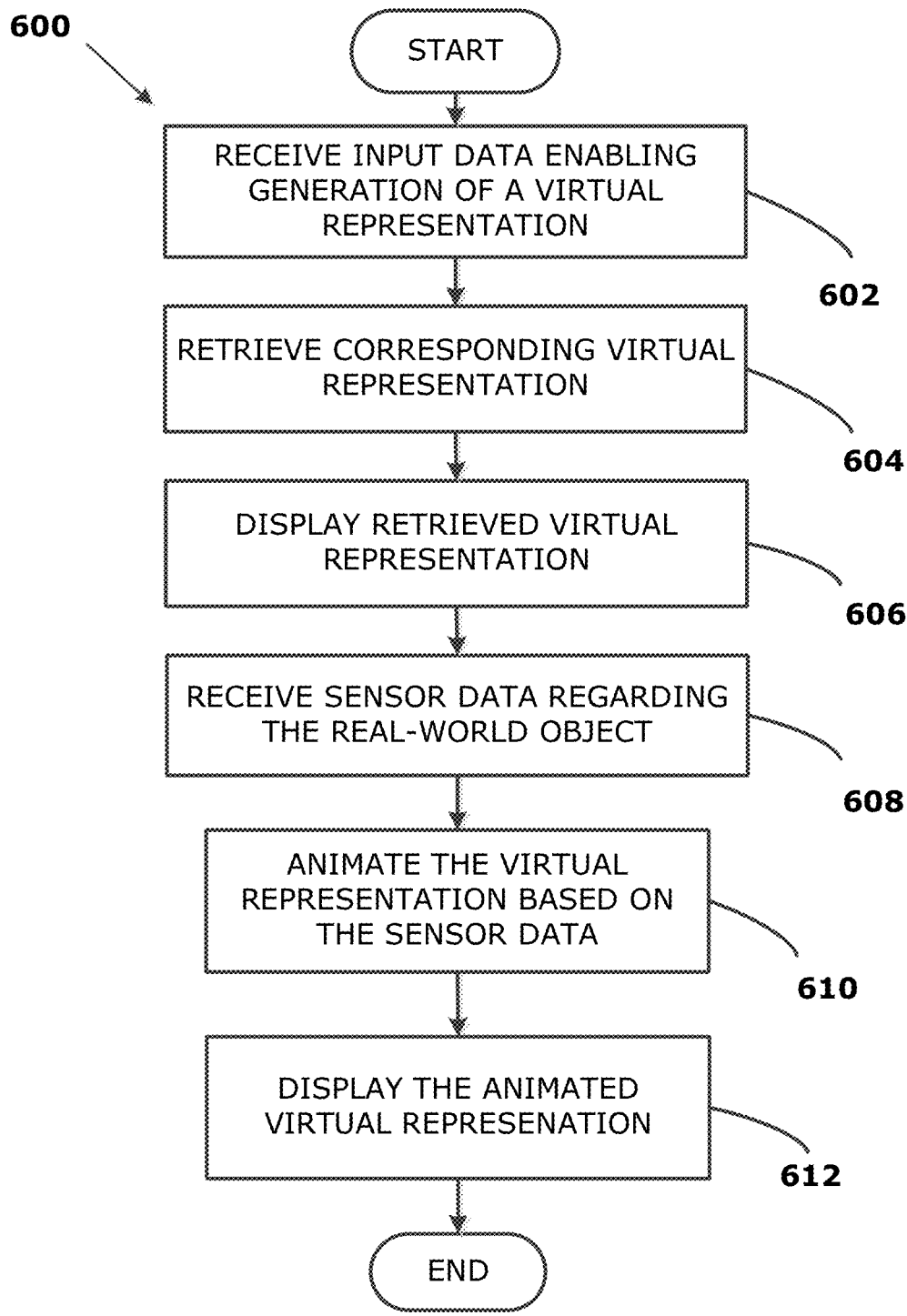
FIG. 6A is a flowchart that details a method of providing animated virtual representations in accordance with embodiments described herein.

FIG. 6A is a flowchart 600 that details a method of providing animated virtual representations in accordance with embodiments described herein. The method begins at 602 wherein input data 112 for generating a virtual representation 110 is received. The input data 112 can comprise one or more of image, text and audio data. In some embodiments, the input data can comprise images including QR codes which when scanned by the HMD device 104 enable generation of a virtual representation 110 for display to the wearer 130 wearing the HMD device 104. In some embodiments, the input data 112 can comprise the user-name/password or other identifying indicia such as a phone number of a user of a teleconference system. When the user enters his/her number, the virtual representation 110 comprising a photo-realistic 3D representation of the user can be retrieved and shown to the wearer 130. In some embodiments, a combination of the aforementioned modalities can be employed for the generation of the 3D representations.

A virtual representation is retrieved at 604 based on the received input data. For example, the input data can comprise indicia uniquely identifying a particular virtual representation and when such unique indicia is received, the particular virtual representation is retrieved at 604 and displayed to the wearer 130 at 606. By the way of illustration and not limitation, when the HMD device 104 operates in an AR mode and the wearer 130 views a QR code on an object, such as, an article of clothing or accessory on another person, a virtual representation corresponding to the QR code can be retrieved and shown to the wearer 130 instead of the QR code.

Similar elements can be used in a teleconference system wherein a participant can be in physical proximity to the wearer 130 and participating in a teleconference with the wearer 130 along with other remote participants. In this case, the wearer 130 can see the proximate participant with his/her naked eyes and without the HMD device 104. Identifying indicia such as the QR code comprised on the clothing or accessory of the proximate participant can be scanned by the HMD device 104 used to generate the photo-realistic 3D representation of the proximate participant for display when the wearer 130 puts on the HMD device 104. In the case of a remote participant, identifying indicia such as the username/password or telephone number can be used to retrieve the respective virtual photorealistic 3D representation. When the wearer 130 uses a teleconference system in accordance with embodiments described herein, the wearer 130 is presented with a display that does not differentiate between the proximate and the remote participants. A uniform view including a plurality of photorealistic 3D representations corresponding to the proximate and the remote participants can be generated and shown to the wearer 130 in the AR mode.

At 608, the sensor data 114 corresponding to the real-world object 120 is received. In some embodiments, the real-world object 120 can be an inanimate object such as a t-shirt or accessory or other item bearing the identifying indicia such as a QR code or image thereon, or via facial recognition of a person. In some embodiments, the real-world object 120 can be a human user who supplies the identifying indicia such as the aforementioned participants in the teleconference system. In some embodiments, the sensor data 114 can comprise data from the location/positioning components of the HMD device 104 such as the camera(s) 230, the gyroscopes 234, the magnetometers 232 and the accelerometers 236. In some embodiments, the sensor data 114 can comprise audio data such as spoken words or sounds from a remote participant in a teleconference system. In some embodiments, data tracking a remotely located real-world object can also be received over a network. Furthermore, if the scene renderer 102 is located on a server disparate from the HMD device 104 then, sensor data can be transmitted to the disparate server via a network.

At 610, the virtual representation 110 is manipulated/deformed/animated based on the sensor data 114. For example, if the sensor data 114 indicates a motion of the real-world object 120, the virtual representation 110 can be animated corresponding to such motion. In another example, a photorealistic 3D representation of a remote teleconference participant displayed to the wearer 130 can be animated based on one or more of the audio and video input received via the sensor data 114. Again, if the scene renderer 102 is comprised in the HMD device 104, the sensor data 114 data can be either received via components on board the HMD device 104 or via a network. If the scene renderer 102 is comprised on a disparate server, then the HMD device 104 can transmit data from the onboard components to the disparate server for animating a rendered 3D representation. Alternately or in addition, the disparate server can also receive sensor data for animating a rendered 3D representation via networked apparatus (such as a camera imaging a remote teleconference participant) other than the HMD device 104 for the animation of the 3D representation 110.

The animated virtual representation 110 is displayed to the wearer 130 at 612. The animated virtual representation 110 can be displayed as an overlay on a portion of the real-world surroundings of the wearer 130 in an AR mode in some embodiments. The animated virtual representation 110 can be displayed in a VR mode either singly or in combination with other virtual environment which may comprise other virtual representations.

It can be appreciated that although the step of receiving sensor data and animating the virtual representation 110 based on the sensor data is shown as occurring after the rendering of the virtual representation 110, this is only by the way of illustration and not limitation. In some embodiments, the steps of receiving the input data 112 and the sensor data 114 can occur simultaneously so that the virtual representation 110 when initially rendered is animated in accordance with the sensor data 114.

Figure 6B:
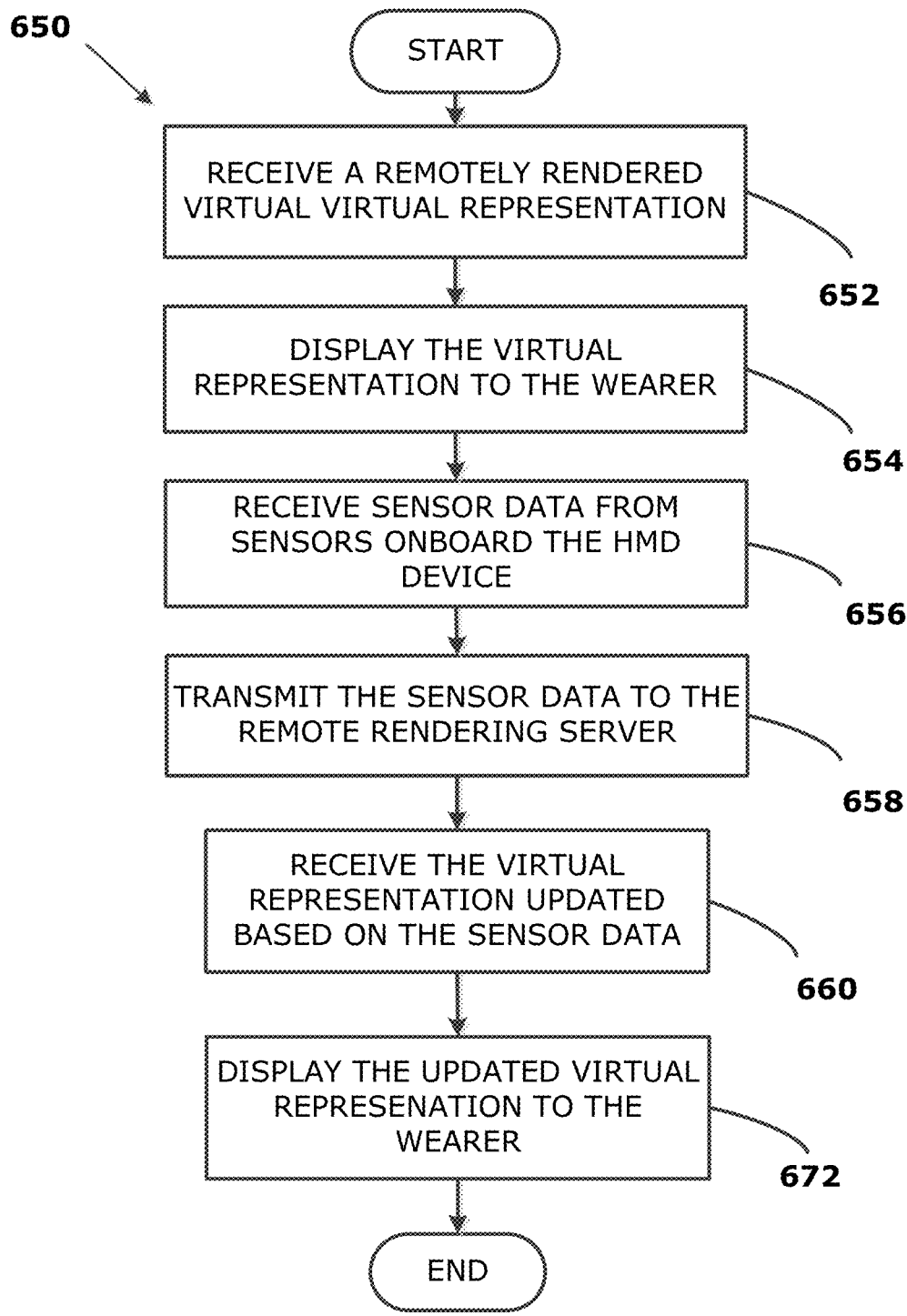
FIG. 6B is a flowchart that details a method of providing animated virtual representations in accordance with embodiments described herein.

FIG. 6B is a flowchart 650 that details a method of providing animated virtual representations in accordance with embodiments described herein. The method begins at 652 wherein a virtual representation rendered by a remote server is received at the HMD device 104. In some embodiments, the virtual 3D representation can be a photorealistic image of a participant who is in teleconference with the wearer 130 of the HMD device 104. The virtual 3D representation is displayed to the wearer 130 on the display screen 218 at 654. The sensor data associated with the wearer 130 is received from sensors onboard or in communication with the HMD device 104 at 656. The sensor data thus received at 656 is transmitted to the remote rendering server at 658. A rendering of the 3D representation updated in accordance with the sensor data is received at 660.

In some embodiments, the sensor data based on which the 3D representation is updated can comprise not only the data transmitted at 658 but also the data received at the remote rendering server from sensors associated with the real-world object on which the 3D representation is based. For example, if the real-world object is located remotely from the wearer 130, then sensor data can be received from sensors onboard or in communication with any HMD device that the real-world object may be using. In some embodiments, the sensor data associated with the remote real-world object can include data from one or more of the camera, voice recorder or other data input devices that may be employed by the remote real-world object. As described in accordance with embodiments herein, the 3D representation can be updated based on specific programming routines that can be applied on the 3D representation in response to particular sensor data. At 662, the 3D representation updated based on the sensor data received at the remote rendering server, is received by the HMD device 104 and the updated 3D representation is displayed to the wearer 130 at 664.

Figure 7:
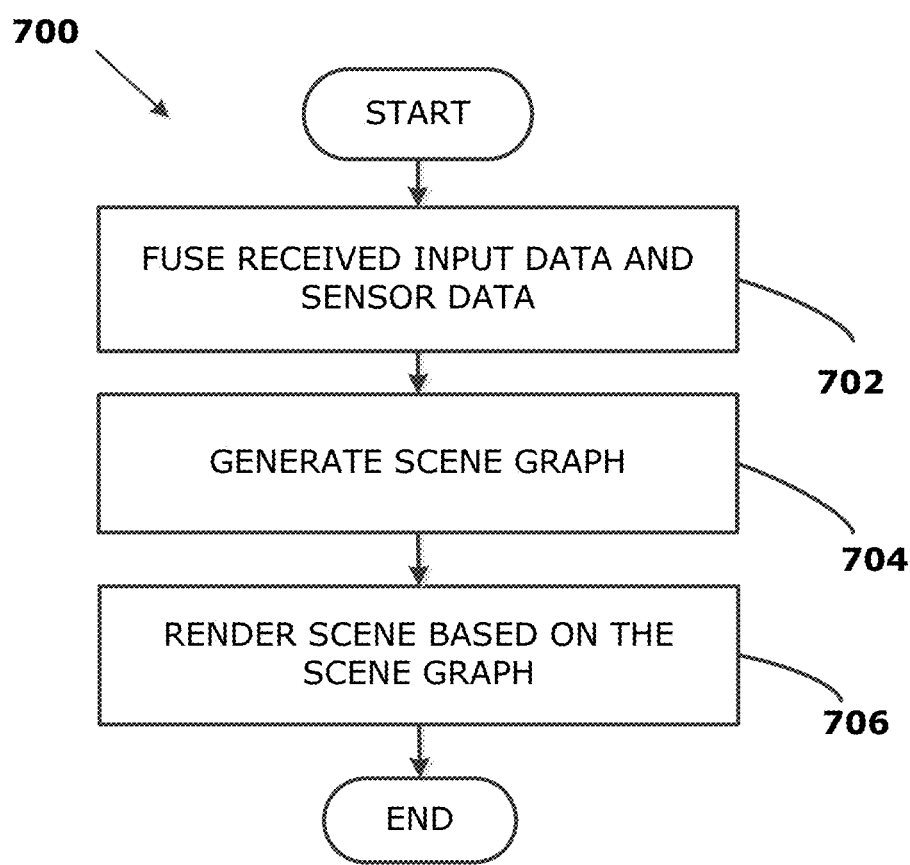
FIG. 7 is a flowchart that details a method of rendering animated virtual representations in accordance with some embodiments.

FIG. 7 is a flowchart 700 that details a method of rendering animated virtual representations in accordance with some embodiments. The method begins at 702 wherein the received input data 112 and the sensor data 114 is fused. In some embodiments, a retrieved virtual representation 110 is fused with the sensor data 114 to create a final pose for the virtual representation 110. A scene graph indicative of the final pose of the virtual representation 110 is generated at 704.

In some embodiments, various programming structures can be defined for applying particular animations to the virtual representation 110 based on the different types of sensor data 114. Thus, if the sensor data 114 indicates motion of the real-world object 120 associated with the virtual representation 110, then data related to a programming structure causing an apparent motion of the virtual representation can be selected for inclusion in the scene graph. In another example, if the sensor data 114 comprises audio data, the scene graph can be based on the various programming structures defined for animating the virtual representation 110 based on syllables included in the audio data. The virtual representation 110 based on the scene graph is rendered at 706. The virtual representation 110 thus comprises a choice of representation based on the input data 112 which has been animated in accordance with the received sensor data 114.

Figure 8:
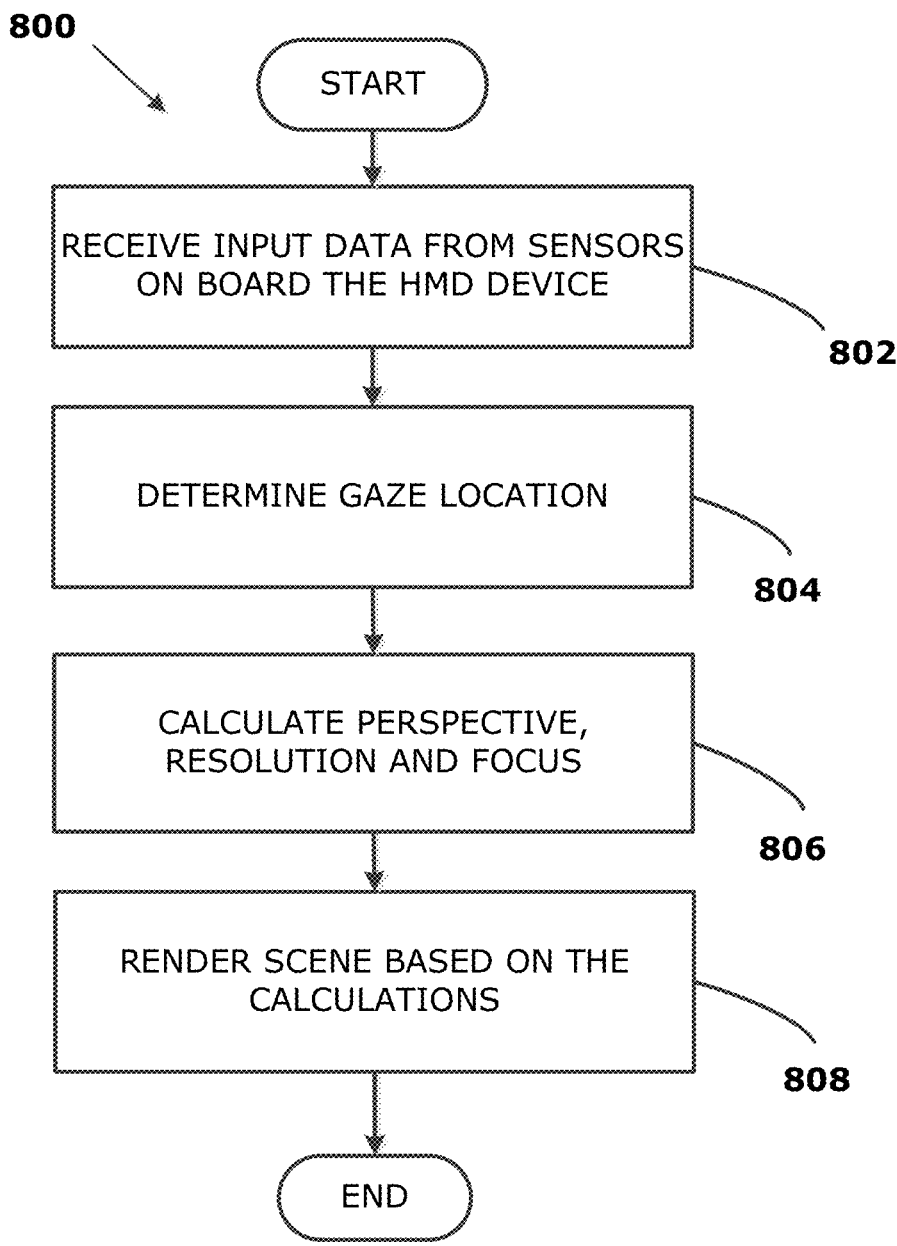
FIG. 8 is a flowchart that details a method of displaying virtual representations in accordance with embodiments described herein.

FIG. 8 is a flowchart 800 that details a method of displaying virtual representations in accordance with embodiments described herein. The method begins at 802 wherein data from the sensors on board the HMD device 104 is received. Such data can comprise data from one or more of the cameras 230, the gyroscopes 234, the magnetometers 232 and the accelerometers 236.

In some embodiments, the cameras 230 can comprise a camera or other sensor looking or aimed outward in the direction of the wearer's 130 gaze, and one or more other camera(s) or sensors focused on the wearer's 130 eyes. Based on the data from such sensors, the location of the wearer's 130 gaze relative to the display screen 218 of the HMD device 104 can be determined at 804. One or more of the perspective, resolution and focus are calculated at 806. This calculation enables precise rendering of the object with respect to the location of the user's pupils as well as focusing extra resolution and detail in the area of focus. Without the precise location of the pupils, the image will be slightly distorted (as eye position is different than pupil position). In some embodiments, this calculation can be done by casting a ray from the position of each pupil in the direction of the image plane. After properly accounting for distortion from lenses that may be on the HMD device 104, the intersection points of the rays with the virtual scene or object can be calculated. The point of convergence is then in perfect focus and maximum resolution, while regions surrounding the point of convergence are calculated with resolution and focus according to virtual camera, scene, and other parameters. A method of calculating the perspective, resolution and focus is described herein only by the way of illustration and not limitation. Any other methods for calculating one or more of perspective, resolution and focus can be used to enable foveated rendering in accordance with embodiments described herein.

Accordingly, the scene is rendered at 808 based on such calculations so that portions of the scene in the field of view of the wearer 130 are in sharp focus while portions of the scene outside the wearer's 130 field of view (FOV) are less focused. In a VR mode, the entire scene comprising the virtual representation 110 and its surrounding virtual environment can be rendered wherein the portion of the virtual environment in the field of view of the wearer's 130 gaze is more focused whereas the portion of the virtual environment lying outside the field of view of the wearer's 130 gaze is less focused.

Figure 9:
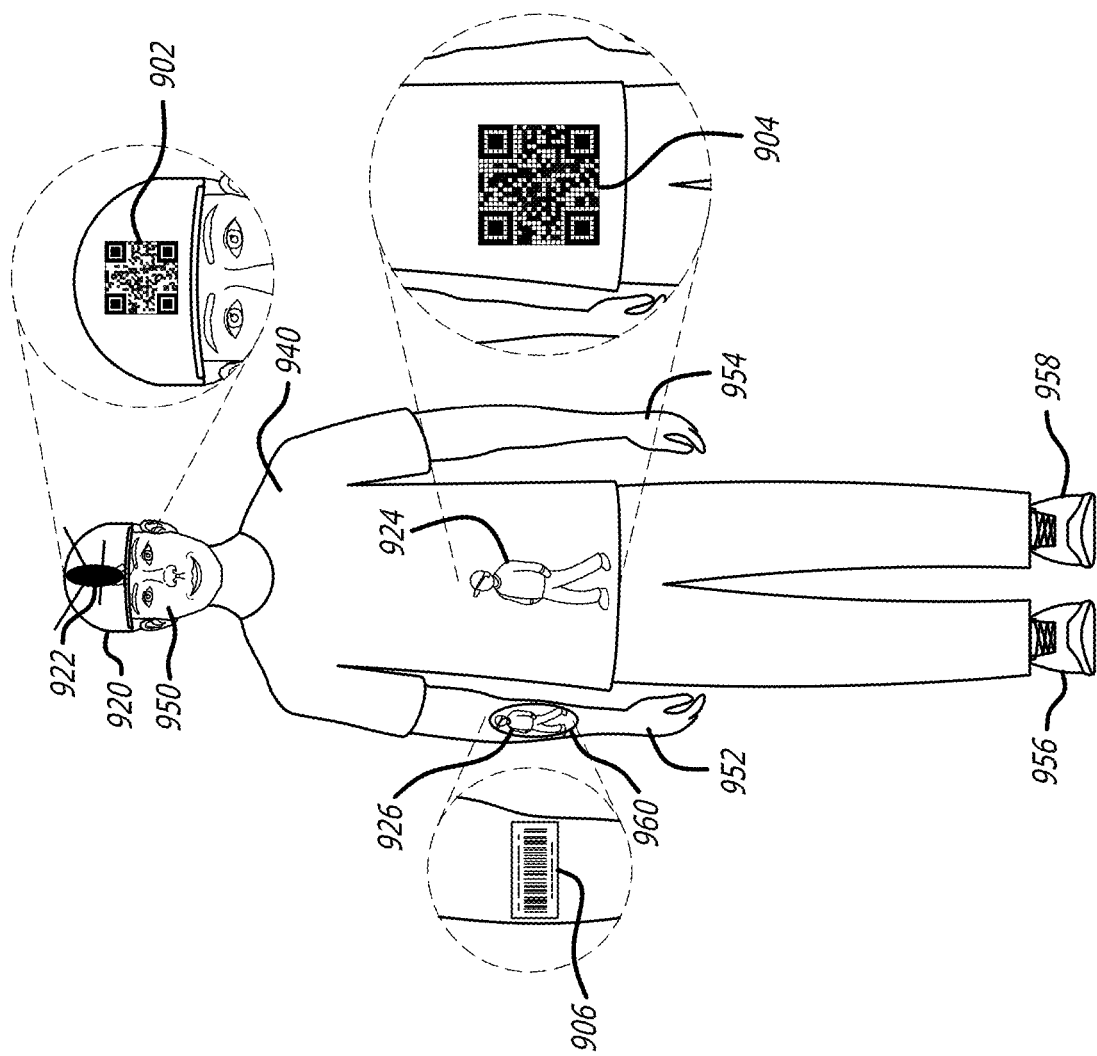
FIG. 9 is an illustration that shows AR/VR displays that are generated in accordance with some embodiments described herein.
Figure 9:
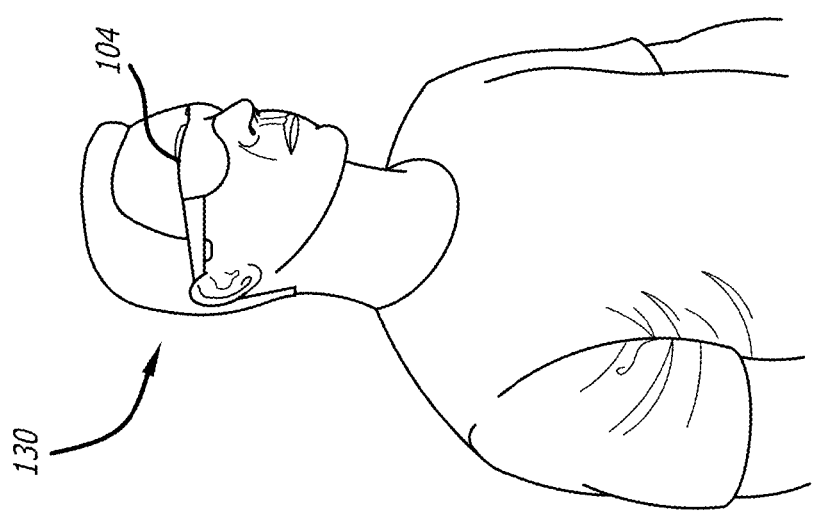

FIG. 9 is an illustration 900 that shows AR/VR displays generated in accordance with some embodiments described herein. The wearer 130 is looking through the HMD device 104 at the real-world object 120 which in this case is a person who bears a plurality of identifying indicia for various animated virtual representations. The first detectable identifying indicia 902 is on the person's cap 920, the second identifying indicia 904 is on the person's shirt 940 and a third identifying indicia 906 is on the person's wrist 960. As described above, the identifying indicia can comprise codes printed on articles, temporary/permanent tattoos, or other markings that can be visible or even invisible to a naked human eye but are detectable or sensed by the wearable device 104.

When the wearer 130 gazes at the person bearing identifying indicia 902, 904, 906, the wearer 130 sees respective virtual representations 922, 924, 926 instead of the identifying indicia 902, 904, 906. In some embodiments, the HMD device 104 can be a virtual reality device. In this case, the wearer 130 views the virtual representations 922, 924 and 926 in a virtual reality mode wherein the real-world object 120 who is the person may or may not be seen by the wearer 130 in such virtual reality. In some embodiments, the HMD device 104 can be an augmented reality device. In this case, the wearer views the representations 922, 924 and 926 in the augmented reality mode wherein the person can be seen in addition to the representations 922, 924 and 926. In some embodiments, a single representation, for example, the representation 924 can be seen by the wearer 130 in the virtual reality mode instead of the person. The virtual representation 924 would therefore obscure or completely occlude the person in the VR view. As discussed herein, the representation 924 can be anchored to the person at the various anchor points. By the way of illustration and not limitation, the representation can be anchored at points 952, 954, 956 and 958 in order to move in accordance with the motion of the person. In either case, the virtual representations 922, 924 and 926 can be animated based on the movements of the person. The representations 922, 924 and 926 can be programmed to execute certain animations in response to tracked lateral, rotatory or oscillatory movements of the person.

Figure 10:
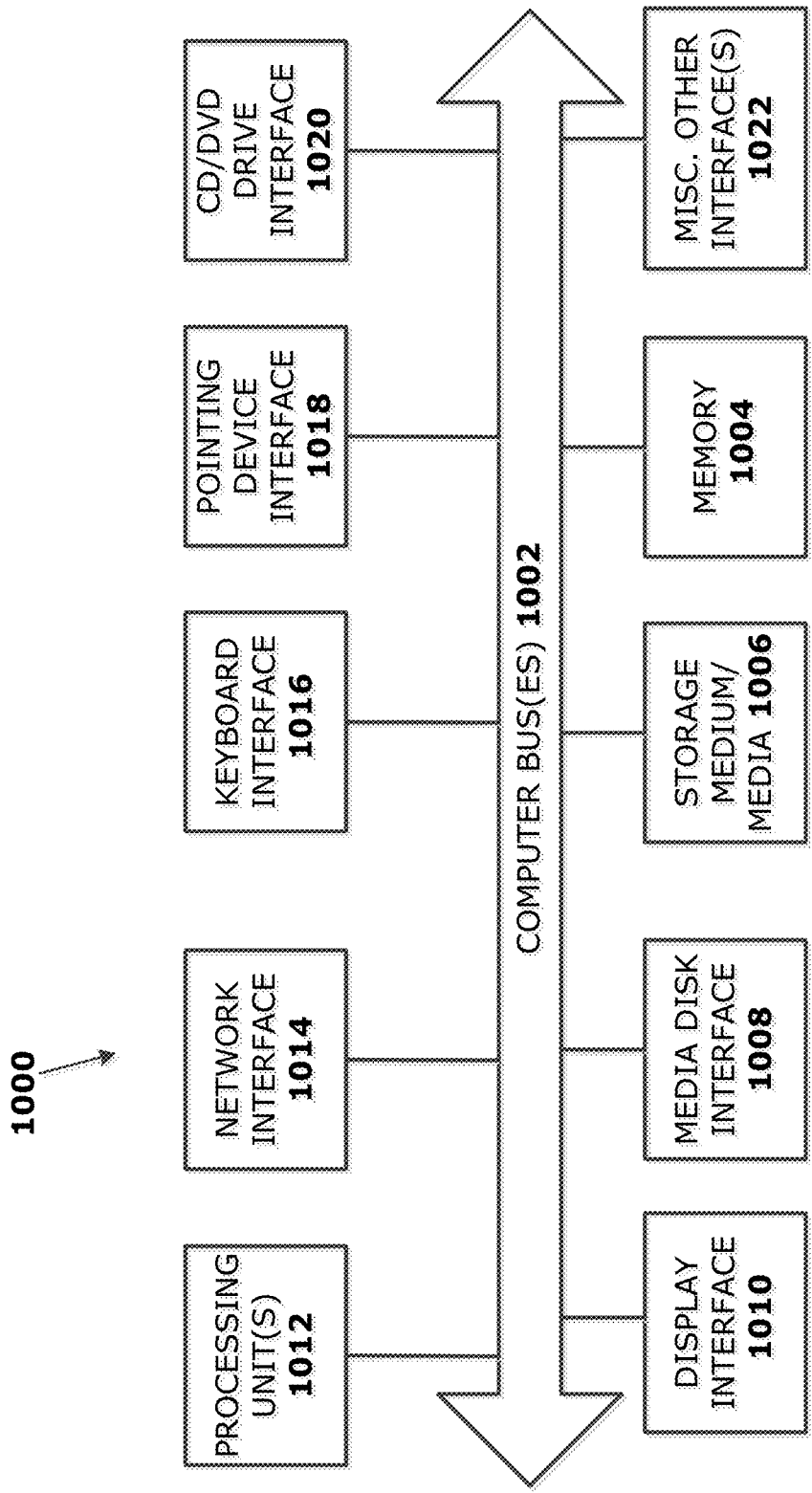
FIG. 10 schematic diagram of the internal architecture of a computing device in accordance with embodiments described herein.

FIG. 10 is a schematic diagram of the internal architecture of a computing device 1000 in accordance with embodiments described herein. The computing device 1000 can be employed as a disparate server comprising the scene renderer 102 in its memory. The computing device 1000 can render the virtual representation 110 and transmit the rendered virtual representation to the HMD device 104. In addition, the computing device 1000 can also be configured to receive sensor data associated with remote sensing components such as those on a HMD worn by a remote conference participant and animate the virtual representation 110 accordingly. In an embodiment, the computing device 1000 includes one or more processing units (also referred to herein as CPUs) 1012, which interface with at least one computer bus 1002. Also interfacing with computer bus 1002 are persistent storage medium/media 1006, network interface 1014, memory 1004, e.g., random access memory (RAM), run-time transient memory, read only memory (ROM), etc., media disk drive interface 1008, an interface 1020 for a drive that can read and/or write to media including removable media such as floppy, CD-ROM, DVD, etc., media, display interface 1010 as interface for a monitor or other display device, keyboard interface 1016 as interface for a keyboard, pointing device interface 1018 as an interface for a mouse or other pointing device, and miscellaneous other interfaces 1022 not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code or logic, and/or computer-executable process steps, incorporating functionality described herein, e.g., one or more of process flows described herein. CPU 1012 first loads computer-executable process steps or logic from storage, e.g., memory 1004, storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, metadata, playlists and other files. Persistent storage medium/media 1006 can further include program modules/program logic in accordance with embodiments described herein and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), program logic, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, by a processor in communication with a HMD (Head Mounted Display) device of a wearer, input data comprising detectable indicia associated with a real-world object and identifying a virtual representation;
retrieving, by the processor, the virtual representation based on the identifying indicia;
providing, by the processor, a display of the retrieved virtual representation in association with the real-world object on a display screen of the HMD for display to the wearer;
receiving, by the processor, sensor data comprising information representing a sensed state of a first portion of the real-world object in relation to the indicia, the sensed state comprising motions of the first portion of the real-world object independent of motions of the wearer, the first portion comprising less than the entire real-world object;
animating, by the processor, a second portion of the virtual representation identified by the indicia based on the received sensor data of the first portion of the real-world object in relation to the indicia; and
providing, by the processor, the animated virtual representation to the display screen for display to the wearer.

2. The method of claim 1, wherein the real-world object is co-located with the wearer and the sensor data further comprises tracking data of the real-world object.

3. The method of claim 2, animating the virtual representation based on the tracking data further comprises:
animating, by the processor, the virtual representation based on audio data and video data associated with the real-world object, the real-world object being a participant in a teleconference with the wearer.

4. The method of claim 3, retrieving the virtual representation based on the identifying indicia further comprising:
retrieving, by the processor, a photo-realistic virtual 3D (3-dimensional) representation of the participant based on the identifying indicia.

5. The method of claim 4, wherein the identifying indicia comprises facial features of the participant.

6. The method of claim 1, animating the virtual representation further comprises:
accessing, by the processor, a plurality of programming structures respectively corresponding to a plurality of predetermined expressions that are configured for application to the virtual representation;
selecting, by the processor, one of the predetermined expressions based at least on the sensor data; and
animating, by the processor, the virtual representation in accordance with the selected predetermined expression.

7. The method of claim 1, animating the virtual representation further comprises:
identifying, by the processor based at least on the sensor data, the second portion of the virtual representation for the animation based on the first portion.

8. The method of claim 1, further comprising:
displaying, by the processor, the animated virtual representation in synchrony with the sensor data.

9. The method of claim 1, further comprising:
positioning, by the processor, a render of the virtual representation at a location of a marker on the real-world object, the marker being the identifying indicia.

10. The method of claim 1, further comprising:
receiving, by the processor, head tracking data associated with movement of the wearer's head; and
adjusting, by the processor, a render of the animated virtual representation based on the head tracking data.

11. The method of claim 1, further comprising:
receiving, by the processor, eye tracking data associated with movement of the wearer's eyes;
adjusting, by the processor, a render of the animated virtual representation based on the eye tracking data; and
enabling, by the processor, foveated rendering of the animated virtual representation based on the eye tracking data.

12. The method of claim 1, receiving the sensor data comprising information representing the sensed state of a first portion of the real-world object further comprises:
receiving, by the processor, sensor data comprising information representing a sensed state of the wearer.

13. The method of claim 11, receiving the sensor data wherein the information associated with the sensed state comprises information associated with sensed state changes.

14. The method of claim 13, the state changes comprising at least one of changes in one of location, movement, expression sounds and speech.

15. A HMD (Head Mounted Display) device comprising:
a processor;
a display screen; and
non-transitory storage medium comprising programming logic for execution by the processor, the programming logic comprising:
data receiving logic that receives input data and sensor data associated with at least one of the real-world object and a wearer of the HMD device, the input data comprising detectable indicia associated with a real-world object and identifying a virtual representation;
retrieving logic that retrieves the virtual representation based on the identifying indicia;
display providing logic that provides a display of the retrieved virtual representation in association with the real-world object on the display screen for display to the wearer;
sensing logic that receives sensor data comprising information representing a sensed state of a first portion of the real-world object in relation to the indicia, the sensed state comprising motions of the first portion of the real-world object independent of motions of the wearer, the first portion comprising less than the entire real-world object;
animating logic that animates a second portion of the virtual representation in the display and identified by the indicia based on the received sensor data of the first portion of the real-world object in relation to the indicia; and
displaying logic that displays the animated virtual representation on the display screen of the HMD to the wearer.

16. The device of claim 15, wherein the real-world object is co-located with the wearer and the sensor data further comprises tracking data of the real-world object.

17. The device of claim 15, the animating logic further comprises:
logic for animating the virtual representation based on audio data and video data associated with the real-world object, the real-world object being a participant in a teleconference with the wearer.

18. The device of claim 15, the retrieving logic further comprising:
   logic for retrieving a photo-realistic 3D representation of the participant based on the identifying indicia.

19. The device of claim 15, the animating logic further comprises:
   accessing logic that accesses a plurality of programming structures respectively corresponding to a plurality of predetermined expressions that are configured for application to the virtual representation;
   selecting logic that selects one or more of the predetermined expressions based at least on the sensor data; and
   logic for manipulating the virtual representation in accordance with the selected predetermined expressions.

20. The device of claim 16, the animating logic further comprises:
   portion identifying logic for identifying based at least on the sensor data, the second portion of the virtual representation for the manipulation based on the first portion.

21. The device of claim 15, further comprising:
   positioning logic for positioning a render of the virtual representation at a location of a marker on the real-world object, the marker being the identifying indicia.

22. The device of claim 15, further comprising:
   head tracking data receiving logic that receives head tracking data associated with movement of the wearer's head; and
   adjusting logic that adjusts a render of the animated virtual representation based on the head tracking data.

23. The device of claim 22, further comprising a sensor configured to track eye movement of the wearer's eyes.

24. The device of claim 23, further comprising eye tracking data receiving logic that receives eye tracking data associated with movement of the wearer's eyes from the sensor;
   logic for further adjusting the render of the animated virtual representation based on the eye tracking data; and
   foveated rendering logic for rendering within a field of view of the wearer, the animated virtual representation based on the eye tracking data.

25. The device of claim 15, the state of the real-world object comprising one or more of a state of motion, expression, sounds and speech.

26. Non-transitory computer-readable storage medium comprising processor-executable instructions for:
   receiving in association with a HMD (Head Mounted Display) device of a wearer, input data comprising detectable indicia associated with a real-world object and identifying a virtual representation;
   retrieving the virtual representation based on the identifying indicia;
   providing, by the processor, a display of the retrieved virtual representation in association with the real-world object on a display screen of a HMD for display to a wearer of the HMD;
   receiving, by the processor, sensor data comprising information representing a sensed state of a first portion of the real-world object in relation to the indicia, the sensed state comprising motions of the first portion of the real-world object independent of motions of the wearer, the first portion comprising less than the entire real-world object;
   enabling animation of a second portion the displayed virtual representation based on the received sensor data of the first portion of the real-world object in relation to the indicia; and
   providing the animated virtual representation identified by the indicia to the display screen for display to the wearer.

27. The medium of claim 26, wherein the real-world object is co-located with the wearer and the sensor data further comprises tracking data of the real-world object.

28. The medium of claim 27, wherein the instructions for animating the virtual representation based on the tracking data further comprise instructions for:
   animating the virtual representation based on one or more of audio data and video data associated with the real-world object, the real-world object being a participant in a teleconference with the wearer.

29. The medium of claim 28, the instructions for retrieving the virtual representation based on the identifying indicia further comprise instructions for:
   retrieving a photo-realistic 3D representation of the participant based on the identifying indicia.

30. The medium of claim 26, the instructions for animating the virtual representation further comprise instructions for:
   accessing a plurality of programming structures respectively corresponding to a plurality of predetermined expressions that are configured for application to the virtual representation;
   selecting one of the predetermined expressions based at least on the sensor data; and
   animating the virtual representation in accordance with the selected predetermined expression.

31. The medium of claim 26, the instructions for animating the virtual representation further comprise instructions for:
   identifying, based at least on the sensor data, the second portion of the virtual representation for the animation based on the first portion.

32. The medium of claim 26, further comprising instructions for:
   displaying the animated virtual representation in synchrony with the sensor data.

33. The medium of claim 26, further comprising instructions for:
   positioning a render of the virtual representation at a location of a marker on the real-world object, the marker being the identifying indicia.

34. The medium of claim 26, further comprising instructions for:
   receiving head tracking data associated with movement of the wearer's head;
   adjusting a render of the animated virtual representation based on the head tracking data;
   receiving eye tracking data associated with movement of the wearer's eyes;
   adjusting a render of the animated virtual representation based on the eye tracking data; and
   rendering within a field of view of the wearer, the animated virtual representation based on the eye tracking data.

35. A method comprising:
   receiving from a remote rendering server, by a processor comprised in a HMD (Head Mounted Display) device of a wearer, a virtual representation associated with a real-world object and identified by indicia, the indicia being associated with the real-world object;

displaying, by the processor, the virtual representation on a display screen of the HMD device;

updating, by the processor, the virtual representation identified by the indicia based on at least sensor data comprising information representing a sensed state of a first portion of the real-world object in relation to the indicia, the sensed state comprising motions of the first portion of the real-world object independent of motions of the wearer, the first portion comprising less than the entire real-world object; and providing, by the processor, the updated virtual representation on the display screen of the HMD device for display to the wearer.

36. The method of claim 35, further comprising:
receiving, by the processor, the sensor data wherein the real-world object is co-located with the wearer; and
transmitting, by the processor to the remote rendering server, the sensor data.

37. The method of claim 35, receiving the virtual representation further comprising:
transmitting, by the processor, the identifying indicia to the remote rendering server;
receiving, by the processor, a photo-realistic virtual representation of a teleconference participant based on the identifying indicia.

38. The method of claim 35, further comprising:
positioning, by the processor, a render of the virtual representation at a location of a marker on the real-world object, the marker being the identifying indicia.

39. The method of claim 35, further comprising:
displaying, by the processor, the updated virtual representation in synchrony with the sensor data.

40. A HMD (Head Mounted Display) device comprising:
a processor;
a display screen; and
non-transitory storage medium comprising programming logic for execution by the processor, the programming logic comprising:
representation receiving logic that receives from a remote rendering server, a virtual representation associated with a real-world object and identified by indicia, the indicia being associated with the real-world object;
display logic that displays the virtual representation on the display screen to a wearer wearing the HMD device;
updating logic that updates the virtual representation identified by the indicia based on at least sensor data comprising information representing a sensed state of a first portion of the real-world object in relation to the indicia, the sensed state comprising motions of the first portion of the real-world object independent of motions of the wearer, the first portion comprising less than the entire real-world object; and
update providing logic that provides the updated virtual representation on the display screen of the HMD device for display to the wearer.

41. The device of claim 40, further comprising:
sensor data receiving logic that receives the sensor data wherein the real-world object is co-located with the wearer; and
transmitting logic that transmits the sensor data to the remote rendering server.

42. The device of claim 40, receiving the virtual representation further comprising:
transmitting logic that transmits the identifying indicia to the remote rendering server; and
logic that receives a photo-realistic virtual representation of a teleconference participant based on the identifying indicia.

43. The device of claim 40, further comprising:
positioning logic that positions a render of the virtual representation at a location of a marker on the real-world object, the marker being the identifying indicia.

44. Non-transitory computer-readable storage medium comprising processor-executable instructions for:
receiving from a remote rendering server, a virtual representation associated with a real-world object and identified by an indicia, the indicia being associated with the real-world object;
displaying the virtual representation on a display screen of a HMD device borne by a wearer;
updating the virtual representation identified by the indicia based on at least sensor data comprising information representing a sensed state of a first portion of the real-world object in relation to the indicia, the sensed state comprising motions of the real-world object independent of motions of the first portion of the wearer, the first portion comprising less than the entire real-world object; and
providing the updated virtual representation on the display screen of the HMD device for display to the wearer.

* * * * *